(12) United States Patent
Despres et al.

(10) Patent No.: US 7,946,159 B2
(45) Date of Patent: May 24, 2011

(54) METHOD AND DEVICE FOR AUTOMATICALLY MEASURING OIL CONSUMPTION OF AN INTERNAL COMBUSTION ENGINE AND FOR CHANGING THE OIL OF SAID ENGINE

(76) Inventors: Jean-Pierre Despres, Etrechy (FR); Jesus Murgui De Fuentes, Valladolid (ES)

( * ) Notice: Subject to any disclaimer, the term of this patent is extended or adjusted under 35 U.S.C. 154(b) by 150 days.

(21) Appl. No.: 12/158,328

(22) PCT Filed: Dec. 18, 2006

(86) PCT No.: PCT/FR2006/051372
§ 371 (c)(1),
(2), (4) Date: Jan. 26, 2009

(87) PCT Pub. No.: WO2007/074279
PCT Pub. Date: Jul. 5, 2007

(65) Prior Publication Data
US 2009/0120176 A1  May 14, 2009

(30) Foreign Application Priority Data
Dec. 22, 2005  (FR) ..................................... 05 53986

(51) Int. Cl.
*G01F 9/00* (2006.01)
(52) U.S. Cl. .................. 73/114.56; 73/114.52
(58) Field of Classification Search ............... 73/114.52, 73/114.56
See application file for complete search history.

(56) References Cited

U.S. PATENT DOCUMENTS

| | | | | |
|---|---|---|---|---|
| 2,669,869 A | * | 2/1954 | Weber | 73/114.56 |
| 3,105,565 A | * | 10/1963 | Pischinger | 177/190 |
| 3,471,696 A | | 10/1969 | Mayer et al. | |
| 3,473,372 A | * | 10/1969 | Manfred | 73/114.56 |
| 3,876,037 A | * | 4/1975 | Rath, Jr. | 184/6.4 |
| 3,908,450 A | * | 9/1975 | Schreiber | 73/114.52 |
| 4,048,497 A | * | 9/1977 | Fritzsche | 250/303 |
| 4,107,984 A | * | 8/1978 | Unger et al. | 73/114.56 |
| 4,522,170 A | * | 6/1985 | Lenk et al. | 123/198 DC |
| 5,019,800 A | * | 5/1991 | Gallert | 340/450.3 |
| 5,273,134 A | * | 12/1993 | Hegemier et al. | 184/6.4 |

(Continued)

FOREIGN PATENT DOCUMENTS
EP  0145800  6/1985
(Continued)

OTHER PUBLICATIONS

Larborn, A., "Automatisering in een motorenlaboratorium", Polytechnisch Tijdschrift, Werktuigbouw, (Niria) Stam Tijdschriften B.V. Rijswijk, vol. 22, No. 6, pp. 235-239, XP 000670559, (1967).

*Primary Examiner* — Freddie Kirkland, III
(74) *Attorney, Agent, or Firm* — Oblon, Spivak, McClelland, Maier & Neustadt, L.L.P.

(57) ABSTRACT

A method for measuring an amount of oil consumed by an internal combustion engine including an oil pan for supplying lubricating fluid. The method: causes the gravitational flow of the oil contained in the engine oil pan, from the oil pan towards a measuring tank; measures and stores a first value of the oil volume contained in the measuring tank; subjects the oil contained in the measuring tank to a pressurized gas thrust causing the rise of the oil from the measuring tank towards the oil pan; and repeats the preceding method at least once to obtain a second value of the oil volume contained in the tank.

16 Claims, 2 Drawing Sheets

U.S. PATENT DOCUMENTS

| | | | |
|---|---|---|---|
| 6,580,366 B1 * | 6/2003 | Engfehr | 340/457.4 |
| 7,249,530 B2 * | 7/2007 | Agama et al. | 73/865.6 |
| 7,428,838 B2 * | 9/2008 | Gugaratshan et al. | 73/1.06 |
| 7,461,546 B2 * | 12/2008 | Schmidt et al. | 73/114.56 |
| 7,763,850 B2 * | 7/2010 | Martin | 250/303 |

FOREIGN PATENT DOCUMENTS

| | | |
|---|---|---|
| FR | 2264270 | 10/1975 |
| GB | 853423 | 11/1960 |

* cited by examiner

METHOD AND DEVICE FOR AUTOMATICALLY MEASURING OIL CONSUMPTION OF AN INTERNAL COMBUSTION ENGINE AND FOR CHANGING THE OIL OF SAID ENGINE

BACKGROUND

The present invention relates to the tests conducted on internal combustion engines while on the test bench. It relates more particularly to the measurement of the lubricant consumption of such engines.

Publication JP3633926 discloses a device for measuring the oil consumption of an internal combustion engine. This measuring device comprises a line conveying the oil from an oil pan to a storage tank supplying an oil reserve transferred by a pump to measuring instruments. This measuring device further comprises a solenoid valve, a sampling pump, an air bleed, a mass flowmeter and a measuring instrument connected to the mass flowmeter. A value of the oil weight drawn off and purged of air is measured by the flowmeter, and the oil consumption of the engine is then displayed.

This device for measuring the oil consumption of an internal combustion engine operates with two pumps, a first pump to pump the oil from the engine oil pan to the storage tank, and a second pump for taking the measurement sample. Furthermore, this device comprises two oil flow paths, one conveying the lubricating fluid to the intermediate tank, and the other conveying the oil to the measuring instruments. It also comprises two distinct measuring elements. Finally, the prior art device does not allow the oil change and resupply of the engine during a test.

BRIEF SUMMARY

The present invention proposes to remedy the drawbacks of the prior art, by providing a method and a device for measuring the oil consumption of an internal combustion engine, that is particularly simple to install and use, requires no pump to convey the oil to the measuring tank, and is capable of performing the oil change and resupply of the engine during a test.

For this purpose, the invention proposes a method for measuring the amount of oil consumed by an internal combustion engine comprising an oil pan for supplying same with lubricating fluid, characterized in that it comprises at least the following steps:

a) causing the gravitational flow of the oil contained in the engine oil pan, from said oil pan toward a measuring tank, b) measuring and storing a first value of an oil weight contained in the measuring tank, c) subjecting the oil contained in the measuring tank to a pressurized gas thrust causing the oil to rise from the measuring tank toward the oil pan, d) repeating the preceding steps at least once so as to obtain a second value of the oil weight contained in the tank.

Advantageously, the oil consumption of the internal combustion engine is obtained by calculating the difference between the first and the second value of the oil weight contained in the measuring tank.

The present invention further proposes a device for measuring the oil consumption of an internal combustion engine equipped with an oil pan, comprising a hermetically sealed measuring tank, at least a first line conveying the oil from the oil pan to the measuring tank, means for measuring a characteristic quantity of the oil thus directed and an electronic control unit suitable for controlling various effectors, to implement the method described above characterized in that it comprises:

mobile means for shutting the first line whereof the opening and gravitation cause the oil to flow from the oil pan toward the measuring tank and, a second line provided with mobile shutting means, connecting said measuring tank to a pressurized gas source, whereof the opening causes the lubricating fluid present in the measuring tank to rise toward the oil pan of the tested engine, which is thereby subjected to the thrust of the pressurized gas.

Advantageously, the measuring tank is positioned below the oil pan of the engine whose oil consumption is measured.

Advantageously, the means for shutting the first line consist of a solenoid valve and the means for shutting the second line consist of a pneumatic valve.

According to one feature of the invention, the means for measuring a characteristic of the oil is a scale on which the measuring tank is placed.

According to another feature of the invention, the device comprises a line for removing the spent lubricating fluid from the oil pan, said line being provided with a discharge valve allowing or preventing the passage of the spent oil from the pan to a recovery tank.

Furthermore, the device according to the invention also comprises a line for supplying fresh lubricating fluid from a feed tank, said line being provided with a valve allowing or preventing the flow of the fresh lubricating fluid from the storage tank toward the measuring tank.

BRIEF DESCRIPTION OF THE DRAWINGS

Other features and advantages will appear from a detailed reading of a nonlimiting embodiment of the present invention, provided with reference to the figures which show.

DETAILED DESCRIPTION

Figure 1:
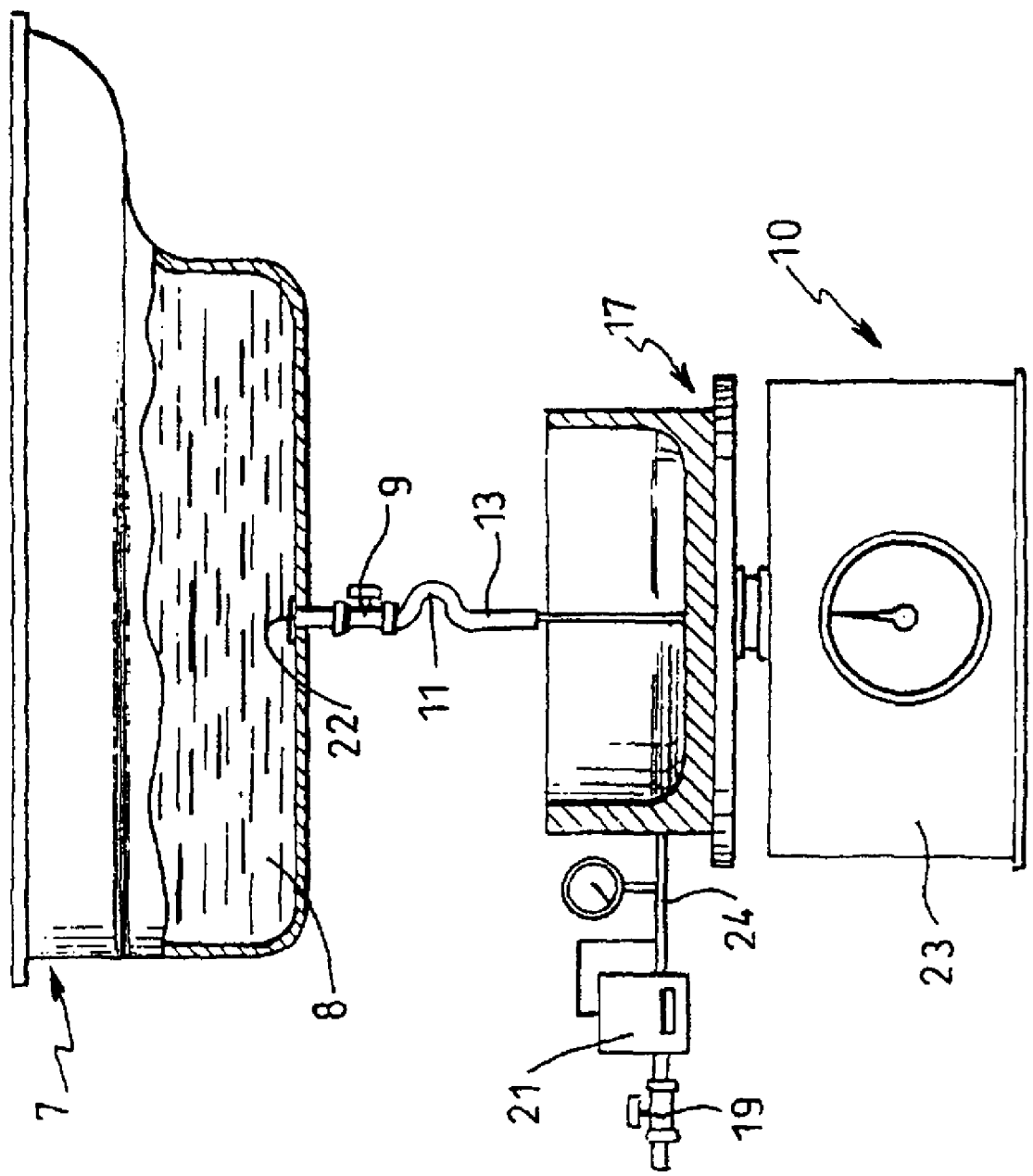
FIG. 1: a schematic view of the measuring device according to the invention connected to the oil pan of the engine whose lubricant consumption is to be measured.

With reference to FIG. 1, it shows an oil pan for the recovery of the lubricating fluid from various elements of the engine. An orifice for removing the lubricating fluid 8 is arranged in the bottom of the pan 7. This orifice 22 communicates with a solenoid valve 9 allowing or preventing the passage of the lubricant 8 toward the measuring device.

In the embodiment shown in FIG. 1, the lubricating fluid 8 flowing from the engine oil pan to the measuring tank encounters the following elements, connected to one another, from upstream to downstream:

a solenoid valve 9 allowing or preventing the passage of the lubricant 8;
a first intermediate line 11;
a rapid coupling connector 13;
a second line 15 conveying the lubricating fluid to the measuring tank; and
a measuring tank 10.

The measuring tank is in contact with a scale 23.

The measuring tank is also connected to a pressurized gas source (not shown) via a pneumatic valve 19, a pressure control device 21 and a line 24.

The device further comprises a programmed electronic control unit suitable for controlling the various effectors of the device according to the invention in order to carry out the measurement sequences.

In order to take an automatic measurement of the engine oil consumption, the operator in charge of the test fills the pan 7 with oil to the low level plus a certain value (advantageously 0.5 liter).

The engine is then installed on the test bench and the operator connects the oil pan to the device according to the invention via the rapid coupling 13.

The engine is then started and run for a predefined period. At the end of this period, the engine is stopped and the drainage solenoid valve 9 controlled by the control unit opens, allowing the lubricating fluid to fill the measuring tank 17. When all the lubricating fluid has been transferred from the oil pan to the measuring tank 17, the assembly is weighed on the scale 23 and the value is recorded.

After this step, the pneumatic valve 19 opens and the lubricating fluid contained in the measuring tank 17 is placed in contact with pressurized air. This causes the oil to rise in the engine oil pan. After the complete discharge of the oil previously contained in the measuring tank 17 toward the pan 7, the solenoid valve 9, is closed and the pneumatic valve 19 is positioned to allow the removal of the compressed air contained in the measuring tank 17.

The engine is rerun for a predefined period. At the end of this operating cycle, the engine is stopped and a new weighing is carried out according to the preceding steps. The solenoid valve 9 is opened and the oil flows by gravity toward the tank 17. A second measurement of the overall weight is taken.

The engine oil consumption is therefore the difference in weight between two successive measurements.

After this second measurement, the oil is again returned to the engine.

Figure 2:
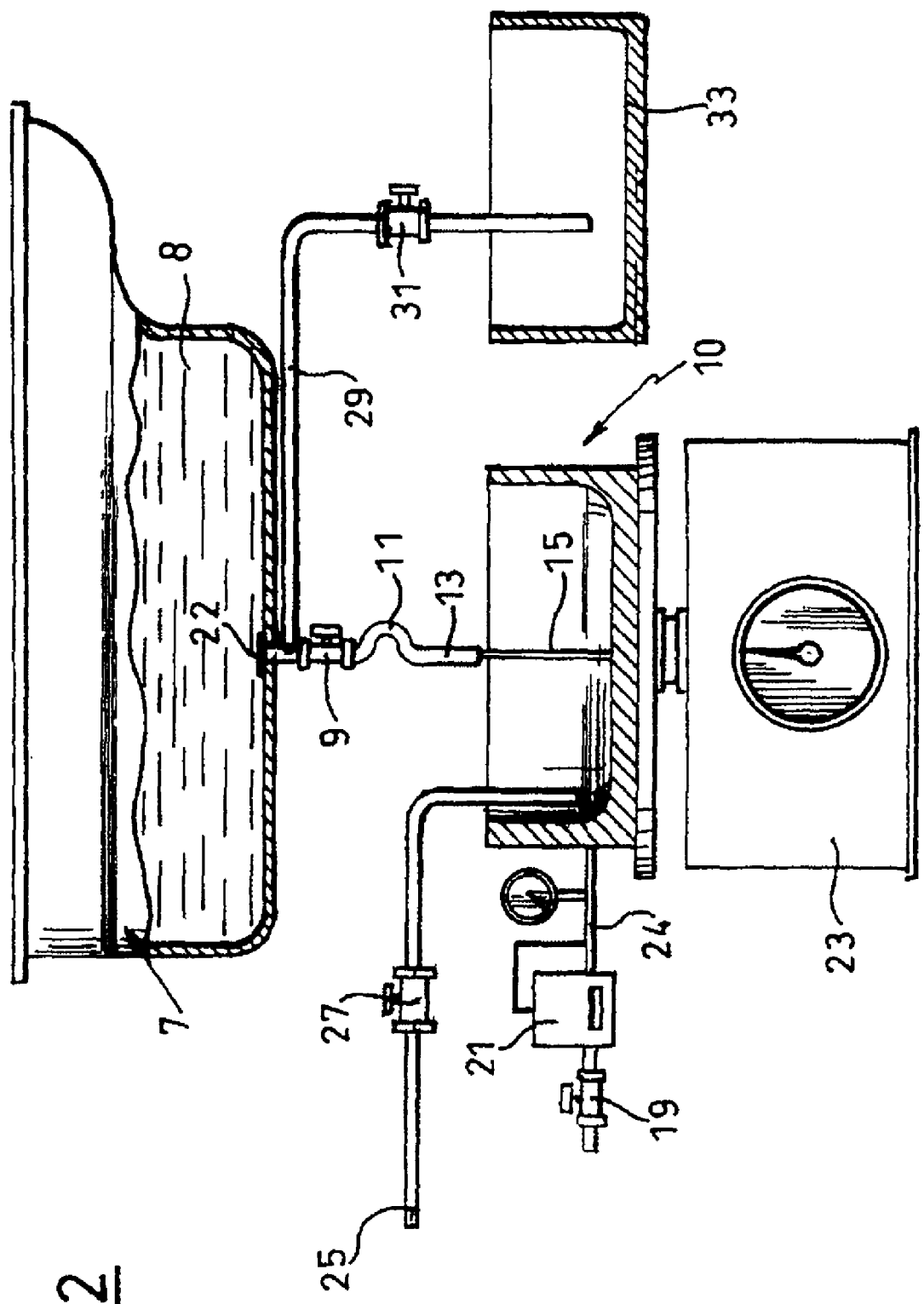
FIG. 2: a schematic view of the device in FIG. 1 equipped with means for carrying out the automatic oil change and resupply of the engine.

FIG. 2 shows an embodiment for performing an automatic oil change and resupply of the engine during a test.

For this embodiment, a fresh lubricant feed line 25 equipped with a shutoff valve 27 has been added to the device previously described. The feed line 25 is connected at one of its ends to a tank (not shown) filled with fresh lubricating fluid, and the other end is connected to the measuring tank 17.

Another drainage line 29 from the oil pan communicates with the orifice 22 of the oil pan at one of its ends, and with a spent lubricating fluid recovery tank 33 at its other end. This line 29 is also equipped with a shutoff valve 31.

When the engine lubricating oil is spent, the electronic control unit orders the opening of the drainage valve 31 and the fluid flows from the oil pan to the recovery tank 33.

After the total drainage of the oil pan 7, the drainage valve 31 is closed. The electronic control unit orders the opening of the feed valve 25 and the fresh lubricating fluid contained in the feed tank flows into the measuring tank 17. When the quantity of fresh lubricating fluid is sufficient, the feed valve 27 is closed.

The programmed control unit then orders the opening of the solenoid valve 9 and then of the pneumatic valve 19. The lubricating fluid contained in the measuring tank 17 is placed in contact with pressurized air. This causes the oil to rise in the engine oil pan. After the complete discharge of the oil previously contained in the measuring tank 17 toward the pan 7, the solenoid valve 9 is closed and the pneumatic valve is positioned to allow the removal of the compressed air contained in the measuring tank 17.

The measurement, drainage and resupply of fresh lubricating fluid are thus carried out without the action of an operator, thereby avoiding the mobilization of a resource and allowing a continuous test.

The invention claimed is:

1. A method for measuring an amount of oil consumed by an internal combustion engine including an oil pan for supplying lubricating fluid, the method comprising:
    a) opening a first valve such that gravitational flow of the oil contained in the engine oil pan transfers all of the oil from the oil pan toward a measuring tank;
    b) measuring and storing a first value of oil weight contained in the measuring tank;
    c) subjecting the oil contained in the measuring tank to a pressurized gas thrust causing the oil to rise from the measuring tank toward the oil pan; and
    d) repeating preceding operations a)-c) at least once to obtain a second value of the oil weight contained in the tank.

2. The measuring method as claimed in claim 1, wherein the oil consumption of the internal combustion engine is obtained by calculating a difference between the first value and the second value of the oil weight contained in the measuring tank.

3. the measuring method as claimed in claim 1, further comprising:
    prior to the opening the first valve, stopping the engine, wherein the engine is stopped until the oil is returned from the measuring tank to the oil pan.

4. A device for measuring oil consumption of an internal combustion engine including an oil pan, a hermetically sealed measuring tank, at least a first line conveying the oil from the oil pan to the measuring tank, a mechanism configured to measure a characteristic quantity of the oil and an electronic control unit suitable for controlling various effectors of the device, the device comprising:
    first mobile means for opening and shutting the first line, wherein, when the first mobile means opens the first line, gravitation causes the oil to flow until all of the oil is transferred from the oil pan toward the measuring tank; and
    a second line including mobile means for opening and shutting the second line, connecting the measuring tank to a pressurized gas source, wherein, when the second mobile means opens the second line, the oil present in the measuring tank rises toward the oil pan of the engine, which is thereby subjected to thrust of the pressurized gas.

5. The device for measuring the oil consumption of an engine as claimed in claim 4, wherein the measuring tank is positioned below the oil pan of the engine whose oil consumption is measured.

6. The device for measuring the oil consumption of an engine as claimed in claim 4, wherein the means for opening and shutting the first line includes a solenoid valve.

7. The device for measuring the oil consumption of an engine as claimed in claim 4, wherein the means for opening and shutting the second line includes a pneumatic valve.

8. The device for measuring the oil consumption of an engine as claimed in claim 4, wherein the mechanism configured to measure a characteristic quantity of the oil includes a scale on which the measuring tank is placed.

9. The device for measuring the oil consumption of an engine as claimed in claim 4, further comprising a removing line configured to remove spent oil from the oil pan toward a recovery tank, the removing line including a discharge valve allowing or preventing passage of the spent oil from the pan to the recovery tank.

10. The device for measuring the oil consumption of an engine as claimed in claim 4, further comprising a supply line configured to supply fresh lubricating fluid from a feed tank, the supply line including a valve allowing or preventing flow of the fresh lubricating fluid from the feed tank toward the measuring tank.

11. A system for measuring oil consumption of an internal combustion engine, comprising:
- an oil pan to collect the oil from the engine;
- a hermetically sealed measuring tank;
- a first line to convey the oil from the oil pan to the measuring tank, the measuring tank being positioned below the oil pan;
- a mechanism to measure a characteristic quantity of the oil;
- a first valve to open and shut the first line wherein, when the first valve is open, gravitation causes the oil to flow until all of the oil is transferred from the oil pan toward the measuring tank; and
- a second line to connect the measuring tank to a pressurized gas source; and
- a second valve to open and shut the second line wherein, when the second valve is open, thrust of the pressurized gas causes the oil present in the measuring tank to rise toward the oil pan of the engine.

12. The system as claimed in claim 11, wherein the first valve is a solenoid valve.

13. The system as claimed in claim 11, wherein the second valve is a pneumatic valve.

14. The system as claimed in claim 11, wherein the mechanism is a scale on which the measuring tank is placed.

15. The system as claimed in claim 11, further comprising a removing line configured to remove spent oil from the oil pan toward a recovery tank, the removing line including a discharge valve allowing or preventing passage of the spent oil from the pan to the recovery tank.

16. The system as claimed in claim 11, further comprising a supply line configured to supply fresh lubricating fluid from a feed tank, the supply line including a third valve allowing or preventing flow of the fresh lubricating fluid from the feed tank toward the measuring tank.

* * * * *